United States Patent [19]
Rodier et al.

[11] Patent Number: 5,829,576
[45] Date of Patent: Nov. 3, 1998

[54] CONTINUOUS FLOW DIP TINNING SYSTEM

[75] Inventors: Sylvain Rodier, Longueuil; Germain Arcand, St Élie d'Orford, both of Canada

[73] Assignee: Corfin Inc., Chambly, Canada

[21] Appl. No.: 624,675

[22] Filed: Apr. 12, 1996

[51] Int. Cl.$^6$ .................................................. B65G 25/00
[52] U.S. Cl. .................................... 198/803.9; 198/803.7; 198/470.1
[58] Field of Search ............................. 198/468.2, 469.1, 198/470.1, 803.3, 803.7, 803.9

[56] References Cited

U.S. PATENT DOCUMENTS

| | | | |
|---|---|---|---|
| 4,775,046 | 10/1988 | Gramarossa et al. ............ | 198/470.1 X |
| 5,064,187 | 11/1991 | Muller .............................. | 198/803.9 X |
| 5,172,802 | 12/1992 | Wells ............................... | 198/803.7 X |
| 5,360,101 | 11/1994 | Carlen .................................. | 198/803.7 |
| 5,395,151 | 3/1995 | Ebesle .............................. | 198/803.9 X |

*Primary Examiner*—James R. Bidwell
*Attorney, Agent, or Firm*—Robic

[57] ABSTRACT

A device for carrying electronic components of various sizes and lengths from a loading area to an unloading area. The device has an endless loop conveyor having a continuously moving element extending longitudinally between the loading area and the unloading area. It also has a plurality of gripping element for gripping the electronic components, which are opened at the loading and unloading areas over a predetermined distance for enabling engagement of at least one electronic component and gripping thereof at the loading area, and disengagement of the electronic component and release thereof at the unloading area. The gripping elements are attached to the continuously moving element and have a pair of elongated legs pivotably connected together in a plane transversal to the continuous moving element and having opposite lower ends. A spring is operatively associated with the legs for urging the lower ends of the legs together. A pair of opposed finger assemblies are connected to the lower ends of the legs respectively, and extending perpendicularly thereto. Each finger assembly includes a row of parallel, spaced apart, generally flat strips, the flat strips of both finger assemblies having inner edges for gripping at least one electronic component exposed to air. The strips of at least one of the finger assemblies is rotatably connected to the lower end of the corresponding leg and urged into gripping position. This device is particularly well adapted for use in a DIP tinning machine.

18 Claims, 9 Drawing Sheets

5,829,576

CONTINUOUS FLOW DIP TINNING SYSTEM

FIELD OF THE INVENTION

The present invention is related to a device for carrying electronic components of various sizes and lengths. More specifically, the present invention relates to such a device for use in a machine used for DIP tinning.

DESCRIPTION OF THE PRIOR ART

In the electronic industry, components such as dual in-line packages, hereinafter referred to as "DIPs", must usually have their metal leads "tinned" to prevent soldering defects before placing the DIPs on or in a printed circuit board. This process is well known in the art and essentially consists of covering the leads with a hot solder coating to thereby assure the solderability of the leads and reduce defects and reworks.

A number of methods and apparatuses have been proposed for carrying out this process, such as the method and apparatus disclosed in Canadian Patent No. 1,256,323 issued in 1989 and assigned to the present Applicant. One problem associated with that apparatus is that the electronic components carried through the apparatus are gripped by their opposite longitudinal ends one at a time. This results in having to precisely synchronize the electronic components at the loading area so that they can be properly gripped by gripping arms. This also results in lower productivity as a plurality of electronic components may not be gripped by a single gripping means. Another disadvantage with this apparatus is that it provides only limited flexibility when gripping electronic components of different sizes.

Also known in the art is an apparatus for carrying power strips through a processing area. The gripping means of this apparatus grips a power strip on each side of the power strip. However, the size of the gripping means is much smaller than the size of the power strip, resulting in that only one power strip may be gripped by a gripping means.

SUMMARY OF THE INVENTION

It is an object of the present invention to provide a device for carrying electronic components of various sizes and lengths from a loading area to an unloading area. The electronic components are carried by the sides of their body portions by gripping means which open at the loading area to grip a component and open at the unloading area to release the component.

It is another object of the present invention to provide improved gripping means which adapt to electronic components of various sizes and lengths and which may grip one or more electronic components at a time.

It is a further object of the present invention to provide a device for carrying electronic components which does not rely on accurate synchronization for feeding the electronic components at the loading area.

It is still a further object of the invention to provide a device for carrying electronic components through a machine wherein the electronic components may be subjected to a tinning process.

In accordance with these and other objects, the present invention broadly provides a device for carrying electronic components of various sizes and lengths from a loading area to an unloading area. The device comprises an endless loop conveyor having a longitudinally continuously moving element extending between the loading area and the unloading area.

A plurality of gripping means for gripping the electronic components are attached to the continuous moving element. Each of the gripping means comprises a pair of elongated legs pivotably connected together and having opposite lower ends, means for attaching one of the legs to the continuous moving element, the other leg being pivotable relative to the one leg in a plane transversal to the continuous moving element, spring means operatively associated with the legs for urging the lower ends of the legs together, and a pair of opposed finger assemblies connected to the lower ends of the legs respectively and extending perpendicularly thereto. Each finger assembly includes a row of parallel, spaced apart, generally flat strips, the flat strips of both finger assemblies having inner edges for gripping at least one electronic component exposed to air, each of the strips of at least one of the finger assemblies being rotatably connected to the lower end of the corresponding leg and urged into gripping position by biasing means operatively associated therewith.

There is also provided opening means operatively positioned at the loading and unloading areas for pressing the other leg of each gripping means passing thereby towards the one leg of the gripping means and thus causing the gripping means to open for a predetermined distance for enabling engagement of at least one electronic component and gripping thereof at the loading area, and disengagement of the at least one electronic component and release thereof at the unloading area.

BRIEF DESCRIPTION OF THE DRAWINGS

The present invention and its advantages will be more easily understood after reading the following non-restrictive description of preferred embodiments thereof, made with reference to the following drawings in which.

DESCRIPTION OF A PREFERRED EMBODIMENT OF THE INVENTION

Figure 1:
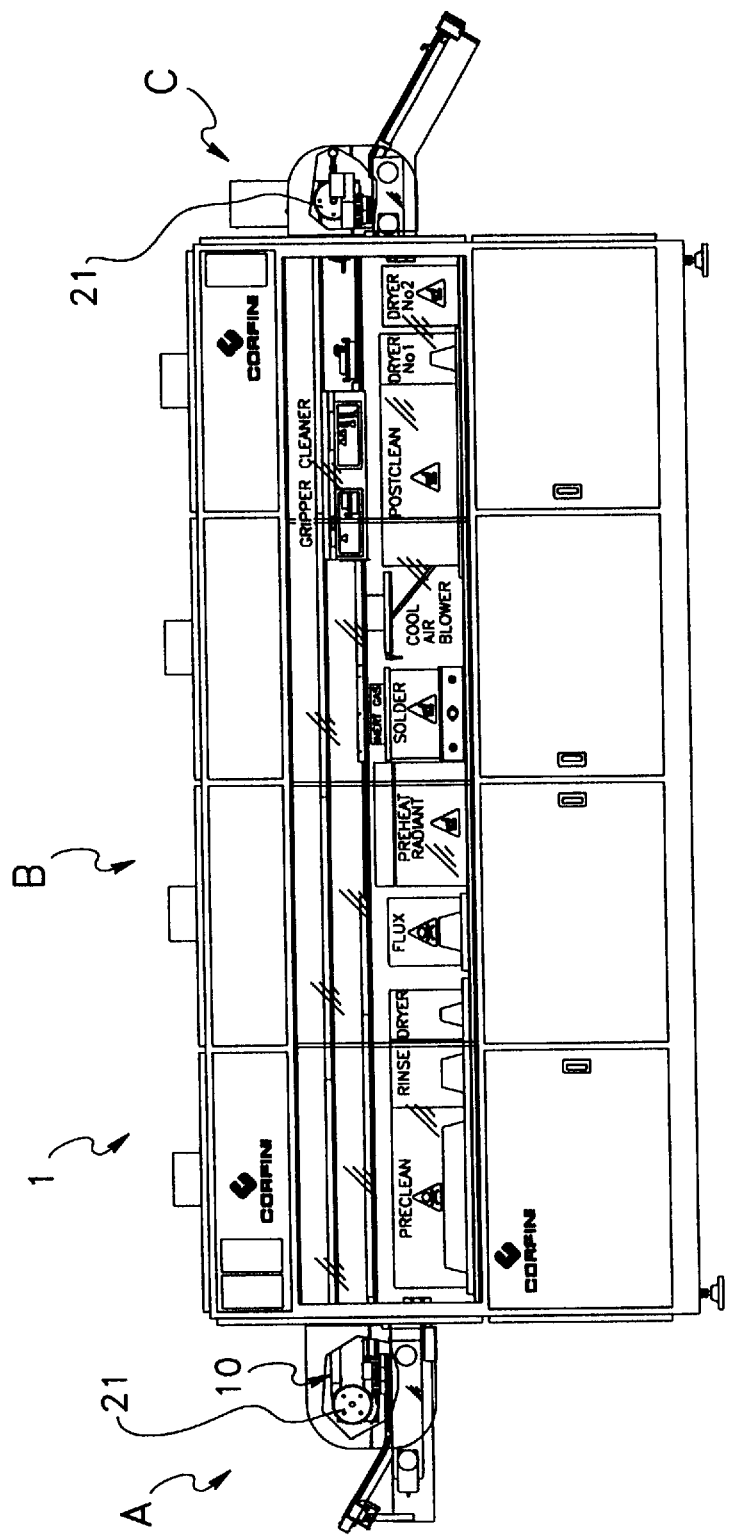
FIG. 1 is a front elevational schematic representation of a DIP tinning machine incorporating a device according to the invention.

FIG. 1 shows a machine 1 incorporating a device 10 according to the invention for continuously carrying electronic components 3 of various sizes and lengths from a loading area A to an unloading area C through a processing section B. The following description will refer to a device 10 where the electronic components 3 are DIPs, and where the processing section B includes means for tinning the DIPs. However, it should be understood that any electronic component may be carried by the device 10, and this device can be used in other machines.

The device 10 comprises an endless loop conveyor having a longitudinally continuously moving element, preferably a roller chain 20, extending between the loading area A and the unloading area C. The conveyor includes opposite sprocket wheels 21, preferably at least one of the sprocket wheels 21 being a driven wheel, about which the roller chain 20 is entrained. Preferably, the roller chain 20 has a horizontal portion between each of the sprocket wheels 21 in order to permit generally horizontal travel of the roller chain 20, and the horizontal portion preferably passes through the processing section B.

Figure 8:
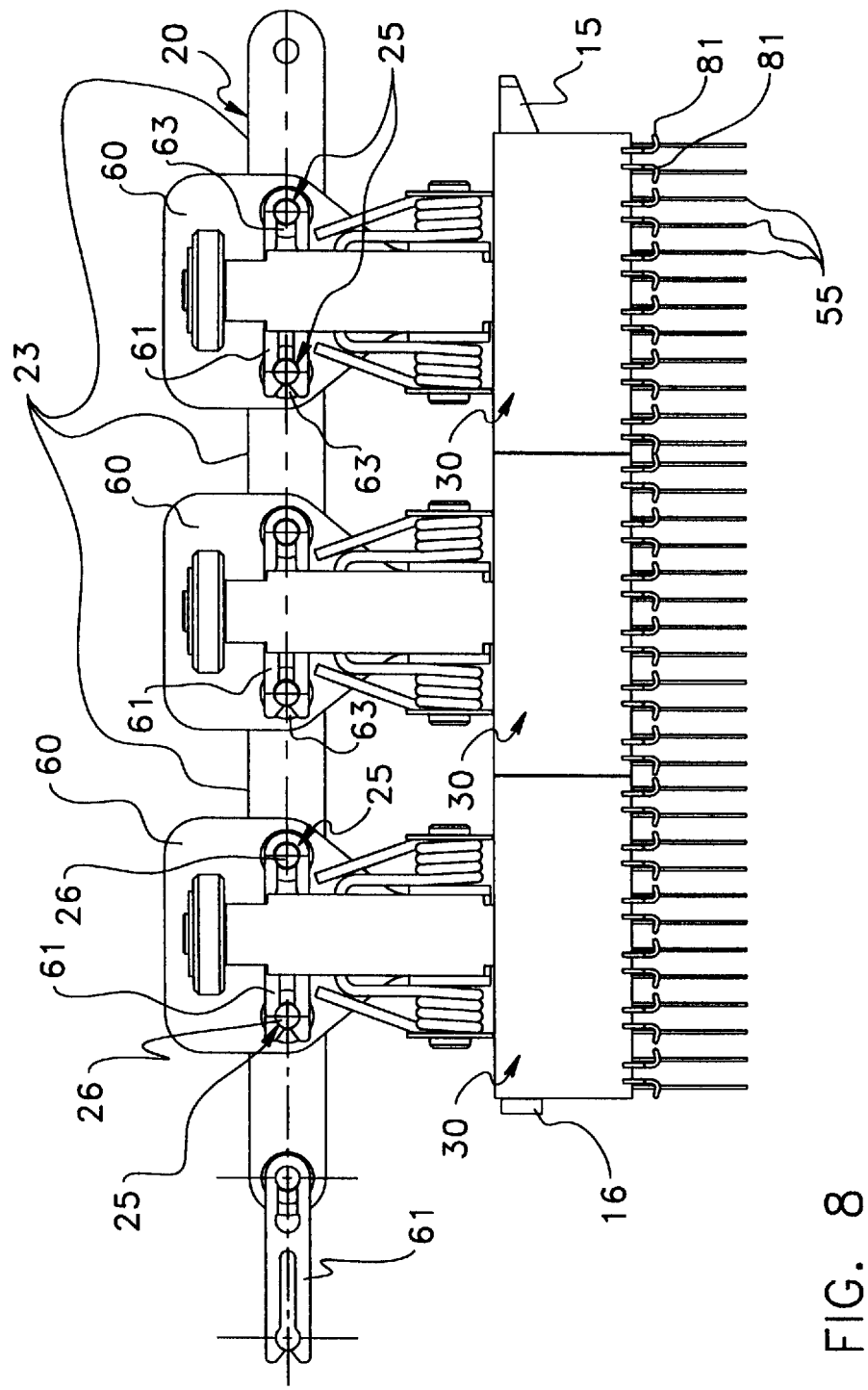
FIG. 8 is a front elevational detail view of a portion of the roller chain of the device according to the invention.
Figure 9:
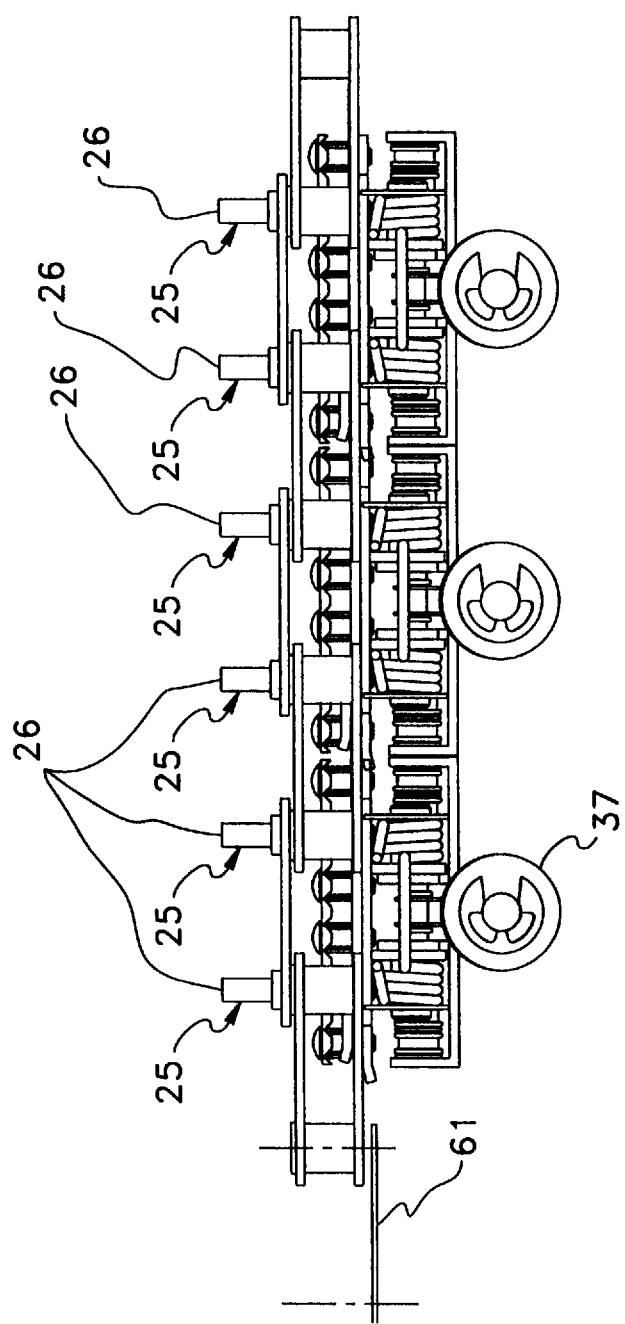
FIG. 9 is a top view of the portion of the roller chain of FIG. 8.

Referring now to FIGS. 8 and 9, the roller chain 20 includes links 23 interconnecting with extended pins 25 having ends 26 projecting from one side of said chain 20 and opposite ends 27, having peripheral grooves, projecting on the opposite side of the chain 20. The sprocket wheels 21 are further provided with slot means 19 to journal the ends 26 of the pins 25 about the sprocket wheels 21, thereby preventing torsion of the chain 20 about the sprocket wheels 21. This feature is better shown on FIG. 4.

Figure 5:
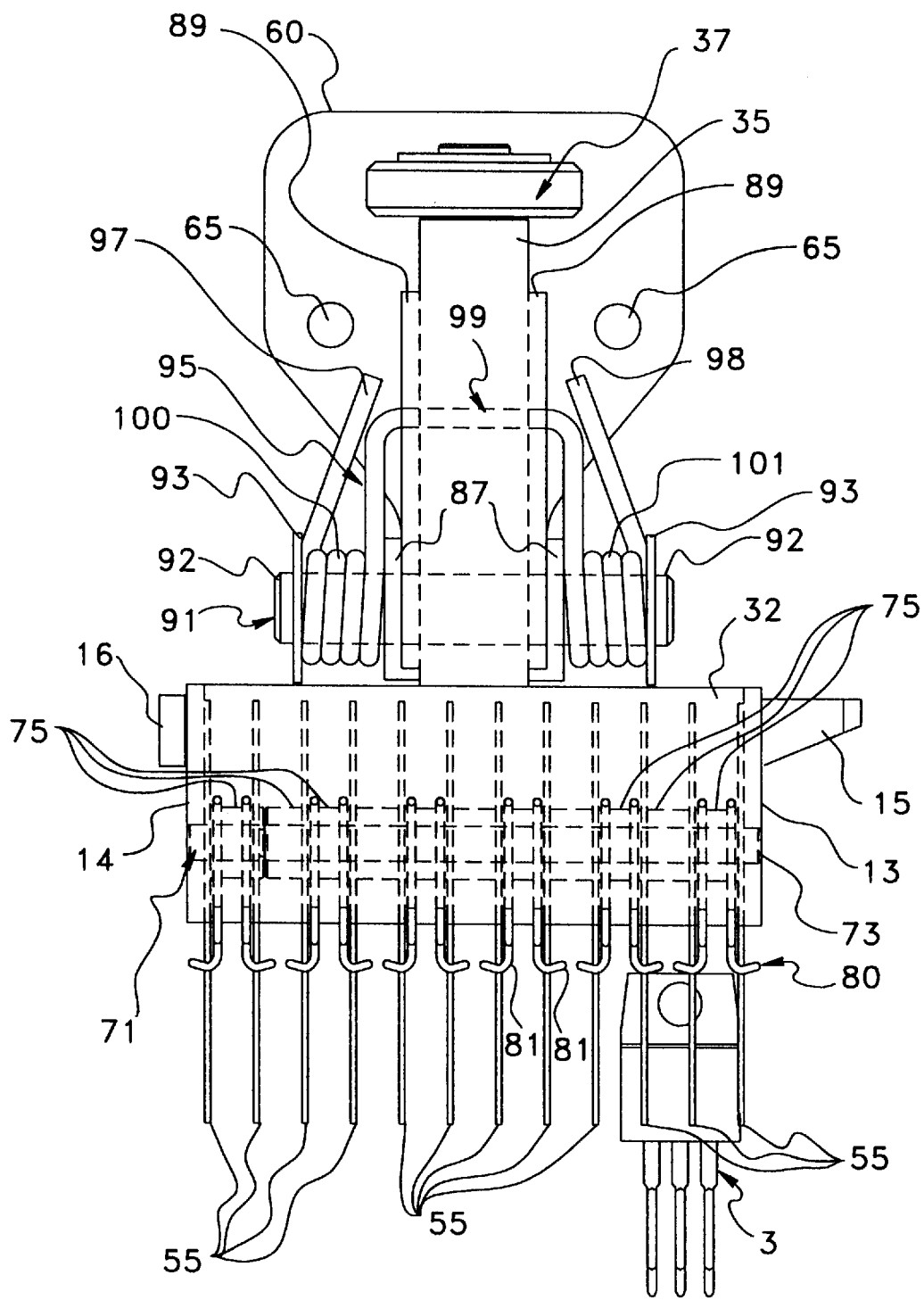
FIG. 5 is a front plan view of one of the gripping means according to the invention.
Figure 6:
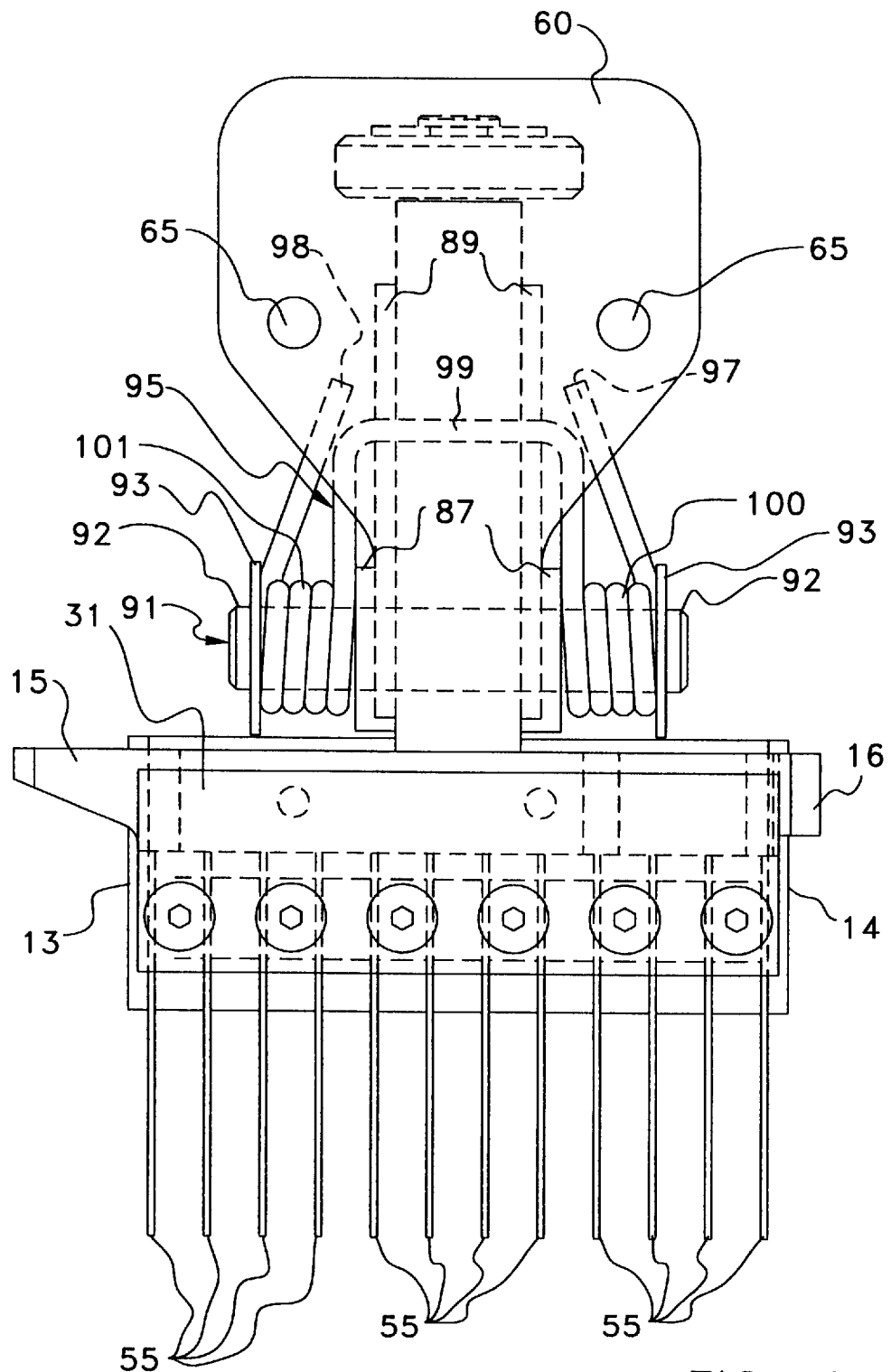
FIG. 6 is a rear plan view of the gripping means of FIG. 5.
Figure 7:
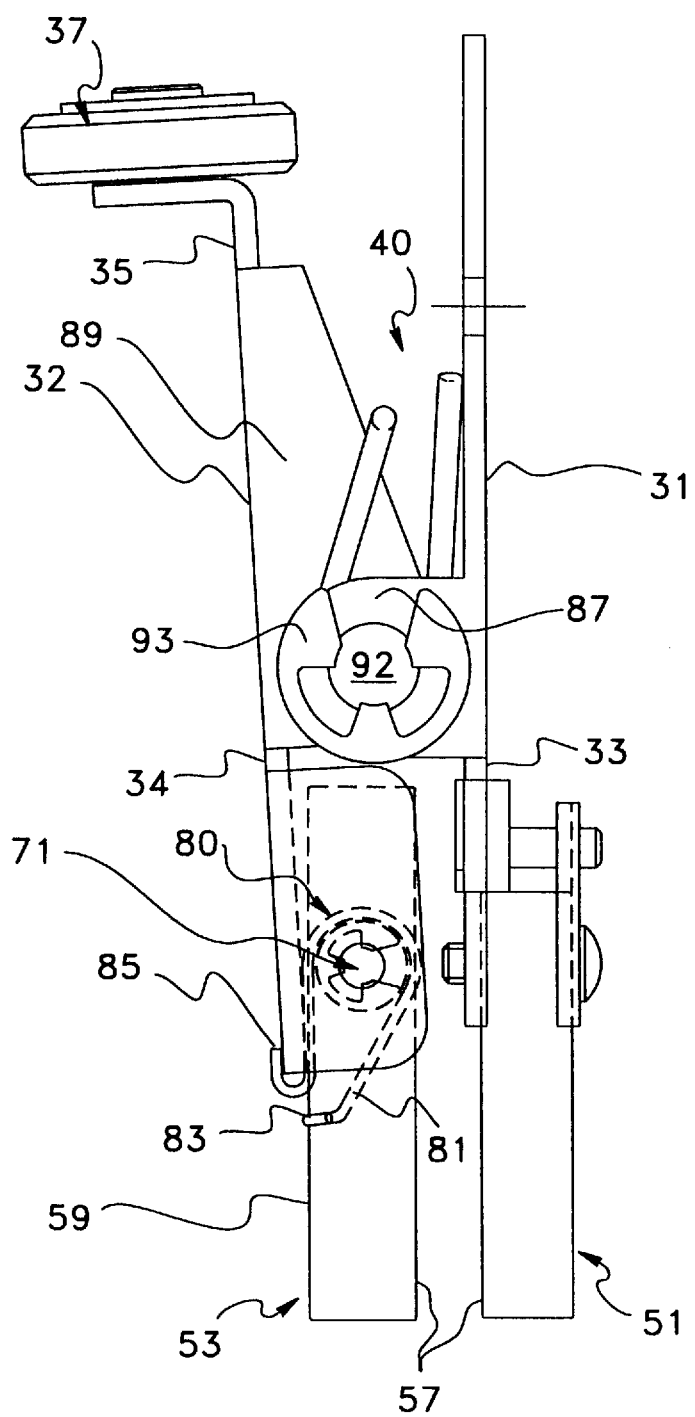
FIG. 7 is a back plan view of the gripping means of FIG. 5.

The device 10 further comprises a plurality of gripping means 30 for gripping the electronic components 3. As shown on FIGS. 5, 6 and 7, each of the gripping means 30 comprises a pair of elongated legs 31, 32 pivotably connected together in a plane transversal to the continuous moving element and having opposite lower ends 33, 34. One of the legs 31 has a pair of longitudinally spaced apart, opposite side ears 87 having aligned holes. The side ears 87 project towards the other leg 32, hereinafter called "pivotable leg". The pivotable leg 32 has a pair of spaced apart, opposite projecting members 89 having holes aligned with the holes of the side ears 87, such that the projecting members 89 extend between and are adjacent the side ears 87. The one leg 31 is pivotably connected to the pivotable leg 32 by a pivot 91 passing through the holes of the side ears 87 and the projecting members 89, the pivot 91 having opposite ends 92 provided with retaining rings 93 to retain the pivot 91 in place.

The one leg 31 has a predetermined length so that when the gripping means 30 are located adjacent each other and travel along the horizontal portion of the roller chain 20, the one legs 31 of each of the gripping means 30 form an uninterrupted straight edge, thus permitting alignment of the loading area A and the unloading area C with the uninterrupted straight edge. The one leg 31 also has two longitudinally opposite ends 13, 14, one 13 of which has a tongue 15 projecting longitudinally, the other 14 having a corresponding groove 16. When the gripping means 30 travel along the horizontal portion thereby forming the uninterrupted straight edge, the tongue 15 of the one leg 31 is inserted into the corresponding groove 16 of an adjacent leg, thereby increasing the solidity of said uninterrupted straight edge. FIG. 8 shows how the gripping means form the uninterrupted straight edge, also shown on FIG. 9.

Figure 2:
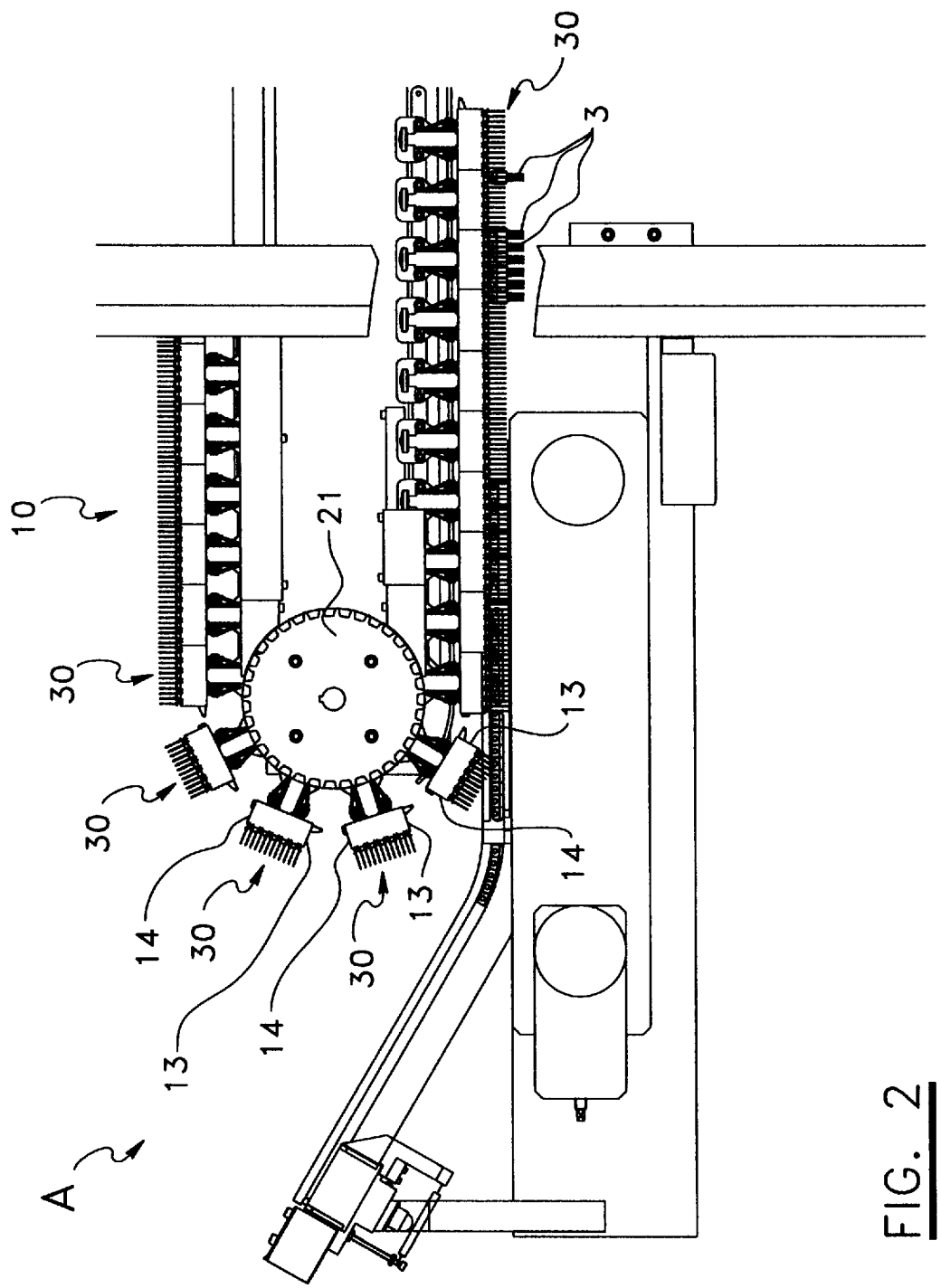
FIG. 2 is a front elevational schematic representation of the loading area of the machine of FIG. 1.
Figure 3:
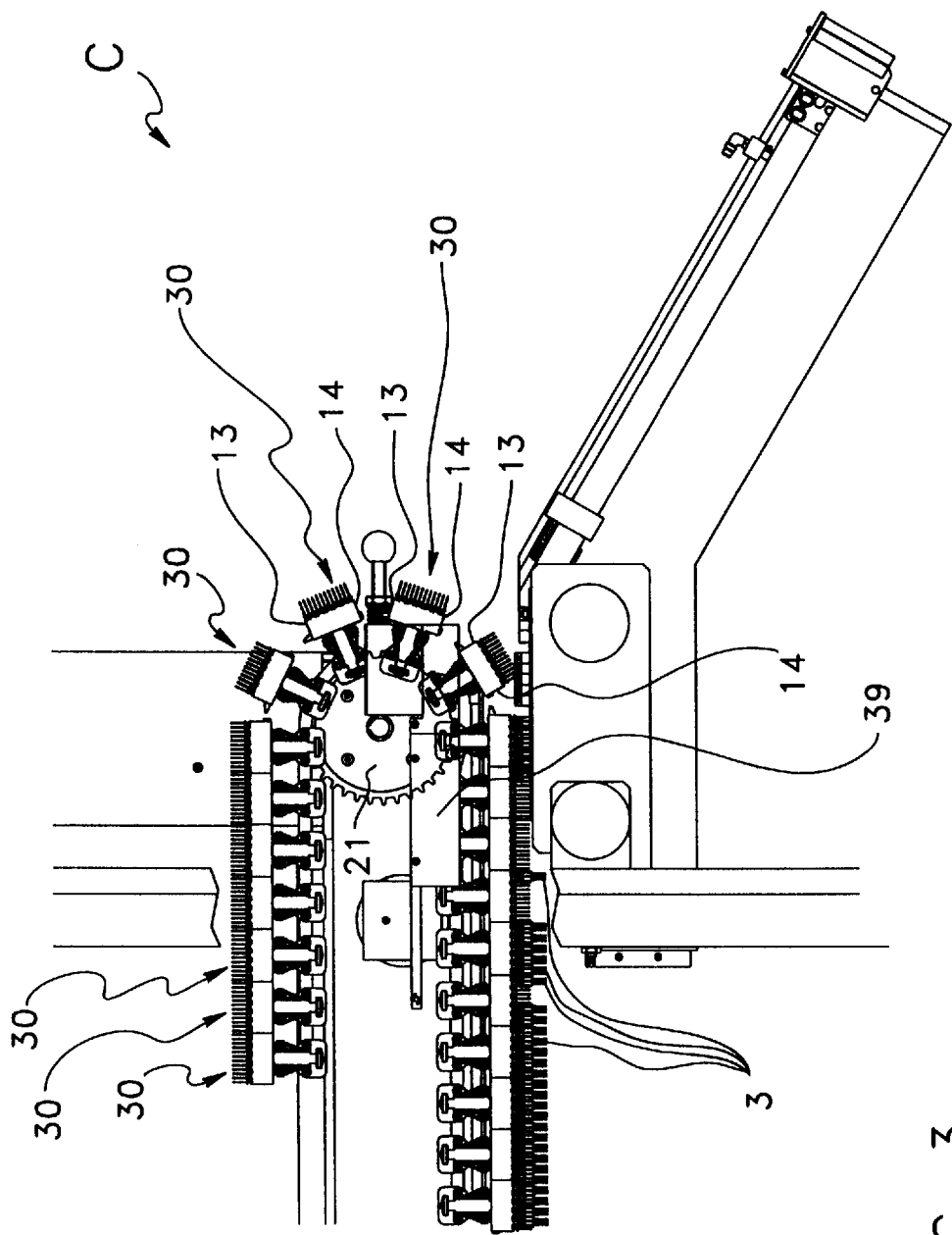
FIG. 3 is a front elevational schematic representation of the unloading area of the machine of FIG. 1.

This important feature of the invention allows the gripping means 30 to grip one or more DIPs 3 at a time as shown of FIGS. 2 and 3. The uninterrupted straight edge thus eliminates any need for synchronizing the arrival of a DIP at the loading area with the arrival of the gripping means. Any number of DIPs 3 may be aligned at the loading area A to be gripped by the gripping means 30 as they travel about the sprocket wheel 21. The same advantage applies at the unloading area C as shown on FIG. 3, where the DIPs are unloaded and then directed to a storage area (not shown). The advantages of gripping the DIPS by their sides has resulted in an increase in production of 4 to 5 times over the existing devices.

Furthermore, this feature allows for electronic components of various lengths to be gripped by the device 10.

Means are provided to attach the one leg 31 to the continuous moving element, comprising a plate 60 solid with the one leg 31 of the gripping means 30. The plate 60 is provided with a pair of spaced apart holes 65 aligned to journal the opposite ends 27 of two successive pins 25 of the chain 20 on the opposite side thereof, the pins 25 thereby jutting out of the plate 60 with their grooves salient. An elongated retaining clip 61 extends from one of the successive pins 25 to the other and is clipped in the grooves thereof to retain the plate 60 in place on the successive pins 25. Spring washers 63 are placed between the retaining clip 61 and the plate 60 on the successive pins 25, as shown on FIG. 8.

Spring means 40 are operatively associated with the legs 31, 32 for urging the lower ends 33, 34 of the legs 31, 32 together. The spring means 40 comprise a spring 95 having two opposite ends 97, 98, a central portion 99 and two coil portions 100, 101. A first opposite end 97 presses on the plate 60, one of the coil portions 100 is coiled around the pin 91 on one side of the upper end 35 of the pivotable leg 32, the central portion 99 presses on the pivotable leg 32, the other coil portion 101 is coiled around the pin 91 on the other side of the upper end 35 and the other opposite end 98 presses on the plate 60, as better shown on FIGS. 5, 6 and 7.

In order to correctly grip the DIPs, a pair of opposed finger assemblies 51, 53 are connected to the lower ends 33, 34 of the legs 31, 32 respectively and extend perpendicularly thereto. Each finger assembly 51, 53 includes a row of parallel, spaced apart, generally flat strips 55, having inner edges 57 for gripping at least one DIP 3 exposed to air. However, it should be understood that any means may be used to grip the electronic components, such as a comb-like strip being attached to the lower end 34 of the pivotable leg 32. In the preferred embodiment according to the invention, each of the strips 55 of one of the finger assemblies 53 is preferably rotatably connected to the pivotable leg 32 and urged into gripping position by biasing means 80 operatively associated therewith. Preferably, the strips 55 are made of titanium so that the solder used in tinning the DIPs does not stick to the fingers.

The finger assembly 53 that is rotatably connected to the lower end 34 of the pivotable leg 32 includes a transversal pin 71 having two opposite ends 73, each of the ends 73 being fastened to the lower end 34 of the pivotable leg 32. Each of the strips 55 have a central opening through which the transversal pin 71 is inserted and spacers 75 between each of the strips 55 to maintain an equidistant spacing therebetween. This allows for drying, airing and cleaning of the leads of the DIPs.

The biasing means 80 comprises a coil spring 81 skirting around the transversal pin 71, having one end 83 pressing against the outer edge 59 of a strip 55 and the other end 85 pressing against the pivotable leg 32. Preferably, as better shown on FIGS. 5 and 7, the other end 85 is curved around the outer edge 59 of a strip to maintain solidity of the assembly.

Since the gripping means 30 are pivotably connected and at least one of the finger assemblies is rotatably connected to the lower end of a leg, the device 10 automatically adjusts itself for electronic components of various thicknesses. Thus, the device is not restricted solely for DIPs, but any electronic component that has to have its leads processed may be carried by the device 10.

In order for the device 10 to function properly, opening means are operatively positioned at the loading A and unloading C areas for pressing the pivotable leg 32 of each gripping means 30 passing thereby towards the one leg 31 of the gripping means 30 and thus causing said gripping means 30 to open for a predetermined distance, thus enabling engagement of at least one electronic component and gripping thereof at the loading area A as shown on FIG. 2, and disengagement of at least one electronic component and release thereof at the unloading area C as shown on FIG. 3.

The opening means comprise a transverse projection 37 fastened to the upper end 35 of the pivotable leg. As shown on FIGS. 4 to 9, the transverse projection 37 is a disc that is free to rotate about a central axis perpendicular to the moving element. However, any type of projection or equivalent system would fulfill the objects of the invention.

Figure 4:
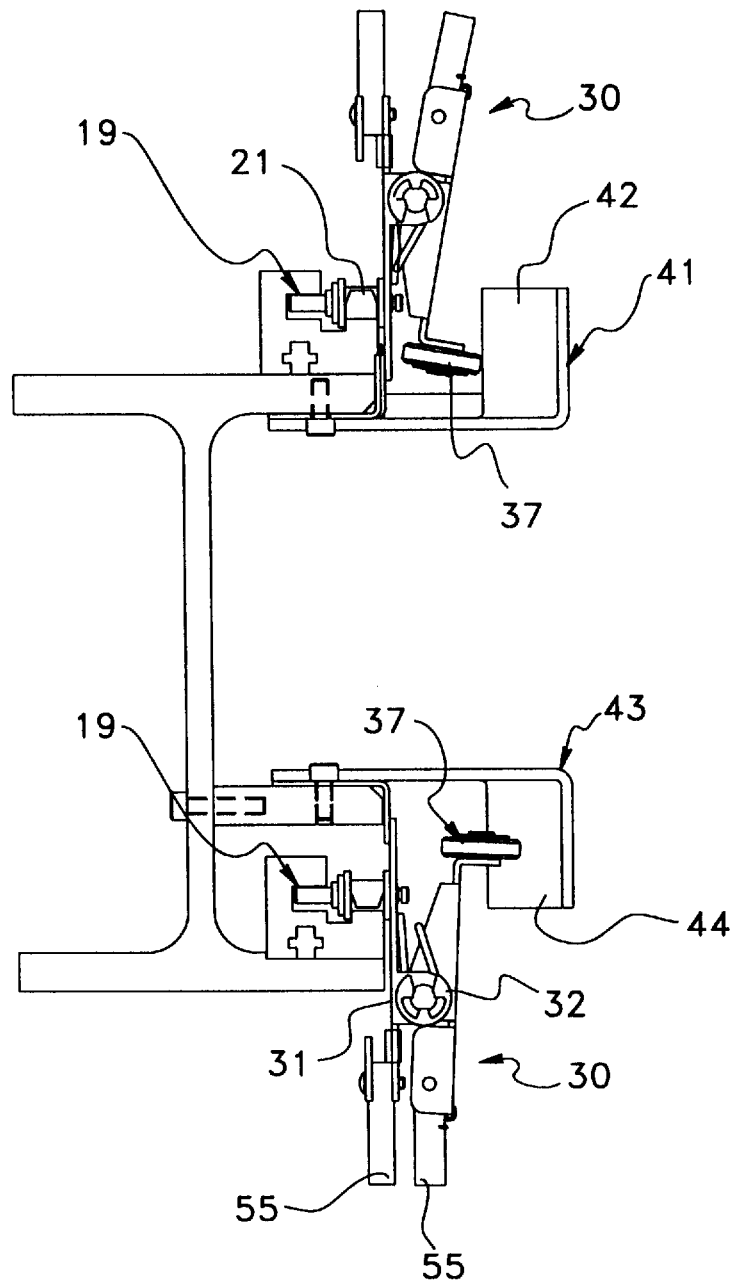
FIG. 4 is a transverse cross-sectional view of the sprocket wheel used in the machine of FIG. 1.

A first flange member 43 shown on FIG. 4 is located near the unloading area C sprocket wheel 21 and has a surface 44 angled towards the sprocket wheel 21 to force the transverse projection 37 of the pivotable leg 32 to move closer the one leg 31 thereby causing opening of the gripping means 30 at the unloading area C to permit unloading of the DIPs.

A second flange member 41 is located near the loading area A sprocket wheel 21 and has a surface 42 angled towards the sprocket wheel 21 to force the transverse projection 37 of the pivotable leg 32 to move closer the one leg 31 thereby causing opening of the gripping means 30 during its course about the sprocket wheel 21 so that the gripping means are opened at the loading area in order to permit loading of the DIPs.

More particularly, FIG. 4 shows, at the top thereof, gripping means 30 that are open. This gripping means 30 is about to travel about the sprocket wheel 21 and grip a DIP at the loading area A. At the bottom of FIG. 4, there is shown gripping means 30 about to reach the unloading area C and disengage the DIP.

Although the present invention has been explained hereinabove by way of a preferred embodiment thereof, it should be pointed out that any modifications to this preferred embodiment within the scope of the appended claims is not deemed to alter or change the nature and scope of the present invention.

What is claimed is:

1. A device for carrying electronic components of various sizes and lengths from a loading area to an unloading area, comprising:
    an endless loop conveyor having a longitudinally continuously moving element extending between the loading area and the unloading area;
    a plurality of gripping means for gripping the electronic components, each of the gripping means comprising:
        a pair of elongated legs pivotably connected together and having opposite lower ends;
        attachment means for attaching one of the legs to the continuous moving element, the other leg, hereinafter called "pivotable leg", being pivotable relative to said one leg in a plane transversal to the continuous moving element;
        spring means operatively associated with the legs for urging the lower ends of the legs together; and
        a pair of opposed finger assemblies connected to the lower ends of the legs respectively, and extending perpendicularly thereto, each finger assembly including a row of parallel, spaced apart, generally flat strips, the flat strips of both finger assemblies having inner edges for gripping at least one electronic component exposed to air, each of the strips of at least one of said finger assemblies being rotatably connected to the lower end of the corresponding leg and urged into gripping position by biasing means operatively associated therewith; and
    opening means operatively positioned at the loading and unloading areas for pressing the pivotable leg of each gripping means passing thereby towards the one leg of said gripping means and thus causing said gripping means to open for a predetermined distance for enabling:
        engagement of said at least one electronic component and gripping thereof at said loading area, and
        disengagement of said at least one electronic component and release thereof at said unloading area.

2. A device according to claim 1, wherein the continuous moving element includes a roller chain and said conveyor includes opposite sprocket wheels located at the loading area and the unloading area respectively, about which said roller chain is engaged, at least one of the wheels being a driven wheel.

3. A device according to claim 2, wherein the pivotable leg of the gripping means has an upper end and said opening means comprise:
    a transverse projection fastened to said upper end;
    a first flange member near the unloading area sprocket wheel having a surface angled towards the sprocket wheel to force said transverse projection of said pivotable leg to move closer said one leg thereby causing opening of the gripping means at the unloading area to permit unloading of said electronic components; and
    a second flange member near the loading area sprocket wheel having a surface angled towards the sprocket wheel to force said transverse projection of said pivotable leg to move closer said one leg thereby causing opening of the gripping means during its course about the sprocket wheel so that the gripping means are opened at said loading area in order to permit loading of said electronic components.

4. A device according to claim 3, wherein:
    said roller chain has a horizontal portion between each of said sprocket wheels; and
    said one leg of the gripping means has a predetermined length so that when said gripping means are located adjacent each other and travel along said straight portion, the one legs of the adjacent gripping means form an uninterrupted straight edge, thus permitting alignment of said loading area and said unloading area with said uninterrupted straight edge.

5. A device according to claim 4, wherein each of said one leg has two longitudinally opposite ends, one of said opposite ends having a tongue projecting longitudinally, the other of said opposite ends having a corresponding groove, whereby when said gripping means travel along said straight portion thereby forming said uninterrupted straight edge, said tongue of one of said one leg is inserted into the corresponding groove of an adjacent leg, thereby increasing the solidity of said uninterrupted straight edge.

6. A device according to claim 5, wherein:
    said roller chain includes links interconnected with extended pins having ends projecting from one side of said chain, and
    said sprocket wheels are further provided with slot means to journal the ends of the pins about the sprocket wheels, thereby preventing torsion of the chain about said sprocket wheels.

7. A device according to claim 6, wherein:

the pins of the chain have opposite ends projecting on the opposite side of the chain, said opposite ends having peripheral grooves, and said attachment means comprises:
- a plate solid with the one leg of the gripping means, said plate being provided with a pair of spaced apart holes aligned to journal the opposite ends of two successive pins of the chain on the opposite side thereof, the pins thereby jutting out of the plate with their grooves salient;
- an elongated retaining clip extending from one of the successive pins to the other and clipped in the grooves thereof to retain the plate in place on the successive pins, and
- spring washers placed between the retaining clip and the plate on the successive pins.

8. A device according to claim 6, wherein said at least one finger assembly that is rotatably connected to the lower end of the corresponding leg includes:
- a transversal pin having two opposite ends, each of said ends being fastened to said lower end, each of said strips having a central opening through which said transversal pin is inserted; and
- spacers between each of said strips to maintain an equidistant spacing; and each of said biasing means comprises a coil spring skirting around said transversal pin and having one end pressing against the outer edge of the corresponding strip and an other end pressing against said other leg.

9. A device according to claim 8 wherein said at least one finger assembly is rotatably connected to the lower end of pivotable leg.

10. A device according to claim 5, wherein:
- said one leg has a pair of longitudinally spaced apart, opposite side ears projecting towards the pivotable leg, said side ears having aligned holes;
- said pivotable leg has a pair of longitudinally spaced apart, opposite projecting members extending between and adjacent said side ears, said projecting members having holes aligned with the holes of said side ears;
- said one leg is pivotably connected to said pivotable leg by a pivot passing through the holes of said side ears and said projecting members, said pin having opposite ends provided with retaining rings to retain the pivot in place;
- said spring means operatively associated with the legs for urging the lower ends of the legs together comprise a spring having two opposite ends, a central portion and two coil portions, whereby a first opposite end presses on said plate, one of said coil portions is coiled around said pivot on one side of said upper end of said other leg, said central portion presses on said other leg, said other coil portion is coiled around said pivot of the other side of said upper end and said other opposite end presses on said plate.

11. A device according to claim 5, wherein said transverse projection includes a disc free to rotate about a central axis perpendicular to the moving element.

12. A device according to claim 5, wherein the flat strips of each of said finger assemblies are made of titanium.

13. A device for carrying electronic components of various sizes and lengths from a loading area to an unloading area, comprising:
- an endless loop conveyor having a longitudinally continuously moving element including a roller chain extending between the loading area and the unloading area, said conveyor including opposite sprocket wheels about which said roller chain is engaged, at least one of said wheels being a driven wheel, where said roller chain includes links interconnecting with extended pins having ends projecting from one side of said chain and opposite ends projecting on the opposite side of the chain, said opposite ends having peripheral grooves, said sprocket wheels being further provided with slot means to journal the ends of the pins about the sprocket wheels, thereby preventing torsion of the chain about said sprocket wheels and said roller chain having a horizontal portion between each of said sprocket wheels;
- a plurality of gripping means for gripping the electronic components, each of the gripping means comprising:
    - a pair of elongated legs pivotably connected together and having opposite lower ends, one of said legs having a pair of longitudinally spaced apart, opposite side ears projecting towards the pivotable leg, said side ears having aligned holes, the other leg, hereinafter called "pivotable leg", being pivotable relative to said one leg in a plane transversal to the continuous moving element, said pivotable leg having an upper end and a pair of spaced apart, opposite projecting members extending between and adjacent said side ears, said projecting members having holes aligned with the holes of said side ears, said one leg being pivotably connected to said pivotable leg by a pivot passing through the holes of said side ears and said projecting members, said pivot having opposite ends provided with retaining rings to retain the pivot in place;
    - attachment means for attaching said one leg to the continuous moving element;
    - said one leg having:
        - a predetermined length so that when said gripping means are located adjacent each other and travel along said horizontal portion, said one leg of each of said gripping means form an uninterrupted straight edge, thus permitting alignment of said loading area and said unloading area with said uninterrupted straight edge; and
        - two longitudinally opposite ends, one of said opposite ends having a tongue projecting longitudinally, the other of said opposite ends having a corresponding groove whereby when said gripping means travel along said horizontal portion thereby forming said uninterrupted straight edge, said tongue of said one leg is inserted into the corresponding groove of an adjacent leg, thereby increasing the solidity of said uninterrupted straight edge;
    - said attachment means comprising:
        - a plate solid with the one leg of the gripping means, said plate being provided with a pair of spaced apart holes aligned to journal the opposite ends of two successive pins of the chain on the opposite side thereof, the pins thereby jutting out of the plate with their grooves salient;
        - an elongated retaining clip extending from one of the successive pins to the other and clipped in the grooves thereof to retain the plate in place on the successive pins; and
        - spring washers placed between the retaining clip and the plate on the successive pins;
    - spring means operatively associated with the legs for urging the lower ends of the legs together, said spring means comprising a spring having two opposite ends, a central portion and two coil portion, whereby a first opposite end presses on said plate, one of said coil portions is coiled around said pivot on one side of said upper end of said other leg, said central portion presses on said other leg, said other coil portion is coiled around said pivot on the other side of said upper end and said other opposite end presses on said plate; and a pair of opposed finger assemblies connected to the lower ends of the legs respectively and extending perpendicularly thereto, each finger assembly including a row of parallel, spaced apart, generally flat strips, the flat strips of both finger assemblies having inner edges for gripping at least one electronic component exposed to air, each of the strips of at least one of said finger assemblies being rotatably connected to the lower end of the corresponding leg and urged into gripping position by biasing means operatively associated therewith;

said at least one finger assembly being rotatably connected to the lower end of the corresponding leg is connected to the lower end of said pivotable leg and includes:

a transversal pin having two opposite ends, each of said ends being fastened to said lower end, each of said strips having a central opening through which said transversal pin is inserted; and spacers between each of said strips to maintain an equidistant spacing therebetween; and each of said biasing means comprises a coil skirting around said transversal pin, having one end pressing against the outer edge of a strip and an other end pressing against said other leg; and opening means operatively positioned at the loading and unloading areas for pressing the pivotable leg of each gripping means passing thereby towards the one leg of said gripping means and thus causing said gripping means to open for a predetermined distance for enabling, engagement of said at least one electronic component and gripping thereof at said loading area, and disengagement of said at least one electronic component and release thereof at said unloading area;

said opening means comprising:

a transverse projection fastened to said upper end;

a first flange member near the unloading area sprocket wheel having a surface angled towards the sprocket wheel to force said transverse projection of said pivotable leg to move closer said one leg thereby causing opening of the gripping means at the unloading area to permit unloading of said electronic components; and a second flange member near the loading area sprocket wheel having a surface angled towards the sprocket wheel to force said transverse projection of said pivotable leg to move closer said one leg thereby causing opening of the gripping means during its course about the sprocket wheel so that the gripping means are opened at said loading area in order to permit loading of said electronic components.

14. A device according to claim 13, wherein said electronic components are DIPs.

15. A device according to claim 14, wherein the flat strips of each of said finger assemblies are made of titanium.

16. A machine suitable for applying a coating to electronic components of various sizes and lengths comprising a loading section including a loading area, a processing section in which the coating is applied, an unloading section including an unloading area, and a device as defined in claim 13 for carrying electronic components, wherein said horizontal portion of said roller chain passes through said processing section.

17. A machine as defined in claim 16, wherein said electronic components are DIPs and said processing section includes means for tinning said DIPs.

18. A machine as defined in claim 17, wherein said flat strips of each of said finger assemblies are made of titanium.

* * * * *